US011964848B1

(12) United States Patent
Roberts et al.

(10) Patent No.: US 11,964,848 B1
(45) Date of Patent: Apr. 23, 2024

(54) ELEVATOR PIT MONITORING AND INTEGRITY CHECK OF MONITORING SYSTEM

(71) Applicant: Otis Elevator Company, Farmington, CT (US)

(72) Inventors: Randy Roberts, Hebron, CT (US); Johanna Whitwell, Hartford, CT (US); Craig Drew Bogli, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/333,134

(22) Filed: Jun. 12, 2023

(51) Int. Cl.
*B66B 5/00* (2006.01)
*B66B 5/16* (2006.01)

(52) U.S. Cl.
CPC ............ *B66B 5/0031* (2013.01); *B66B 5/005* (2013.01); *B66B 5/16* (2013.01)

(58) Field of Classification Search
CPC .............................. B66B 5/005; B66B 5/0031
See application file for complete search history.

(56) References Cited

U.S. PATENT DOCUMENTS 6,202,797 B1 * 3/2001 Skolnick ................. B66B 5/005 187/391
10,112,802 B2 * 10/2018 Dube ...................... B66B 5/005
2020/0039784 A1 * 2/2020 Oggianu ................. B66B 5/005

FOREIGN PATENT DOCUMENTS

| | | | | | |
|---|---|---|---|---|---|
| CN | 112551282 | A | * | 3/2021 | B66B 1/06 |
| CN | 115402902 | A | * | 11/2022 | B66B 1/3415 |
| EP | 3848317 | A1 | * | 7/2021 | B66B 1/3461 |
| WO | WO-2007040538 | A1 | * | 4/2007 | B66B 5/005 |
| WO | WO-2009073001 | A1 | * | 6/2009 | B66B 5/0043 |
| WO | WO-2017157469 | A1 | * | 9/2017 | B66B 5/005 |
| WO | WO-2023274684 | A1 | * | 1/2023 | |

* cited by examiner

*Primary Examiner* — Diem M Tran
(74) *Attorney, Agent, or Firm* — CANTOR COLBURN LLP

(57) ABSTRACT

An elevator system includes a hoistway, an elevator car configured to travel in the hoistway, and a pit located at a bottom of the hoistway. A safety chain is configured to enable or disable motion of the elevator car, and a sensor assembly is configured to initiate opening the safety chain to disable motion of the elevator car upon detection of a person in a detection region of the sensor assembly in the hoistway. A test device is configured to test operation of the sensor assembly to detect malfunctioning and/or tampering of operation of the sensor assembly.

18 Claims, 7 Drawing Sheets

ELEVATOR PIT MONITORING AND INTEGRITY CHECK OF MONITORING SYSTEM

BACKGROUND

The embodiments herein relate to elevator systems, and more particularly, to an elevator system including one or more sensor assemblies to detect a person in a pit of the elevator system.

Persons, such as maintenance personnel, may need to enter the pit of an elevator hoistway for inspection, maintenance, etc. Numerous safety measures exist to prevent injury to persons in the pit. Additional safety measures, although not necessary, may be beneficial.

SUMMARY

According to an embodiment, an elevator system includes a hoistway, an elevator car configured to travel in the hoistway, and a pit located at a bottom of the hoistway. A safety chain is configured to enable or disable motion of the elevator car, and a sensor assembly is configured to initiate opening the safety chain to disable motion of the elevator car upon detection of a person in a detection region of the sensor assembly in the hoistway. A test device is configured to test operation of the sensor assembly to detect malfunctioning and/or tampering of operation of the sensor assembly.

In addition to one or more of the features described herein, or as an alternative, in further embodiments the test device is configured to place a known background across a field of view of the sensor assembly such that the sensor assembly evaluates the known background to test functionality of the sensor assembly.

In addition to one or more of the features described herein, or as an alternative, in further embodiments the sensor assembly is configured to open the safety chain upon when testing operation of the sensor assembly, the evaluated known background is outside of a predetermined threshold.

In addition to one or more of the features described herein, or as an alternative, in further embodiments the test device includes a variable aperture placed across the field of view of the sensor assembly, such that during normal operation of the sensor assembly the aperture is in an open position and during test operation of the sensor assembly the aperture is in a closed position.

In addition to one or more of the features described herein, or as an alternative, in further embodiments the test device includes a movable plate having a fixed opening, such that during normal operation of the sensor assembly the fixed opening is positioned across the field of view and during test operation of the sensor assembly the movable plate blocks the field of view.

In addition to one or more of the features described herein, or as an alternative, in further embodiments the sensor assembly includes a sensor that measures distances to objects in the hoistway.

In addition to one or more of the features described herein, or as an alternative, in further embodiments the sensor includes at least one of a LIDAR sensor, a millimeter wave RADAR sensor and an RGBD camera.

In addition to one or more of the features described herein, or as an alternative, in further embodiments the sensor assembly includes a safety chain contact as a component of the safety chain.

In addition to one or more of the features described herein, or as an alternative, in further embodiments the sensor assembly is configured to detect a tampering device when a detected background varies from an expected background.

In addition to one or more of the features described herein, or as an alternative, in further embodiments the sensor assembly is configured to open the safety chain when the detected background varies from the expected background.

According to another embodiment, a method of operating an elevator system including a hoistway, an elevator car configured to travel in the hoistway, a pit located at a bottom of the hoistway, a safety chain configured to enable or disable motion of the elevator car and a sensor assembly includes detecting, by the sensor assembly, a person in a detection region of the sensor assembly in the hoistway, and upon detection of a person in the detection region, the sensor assembly initiating opening the safety chain to disable motion of the elevator car. Operation of the sensor assembly is tested to detect malfunctioning and/or tampering of operation of the sensor assembly.

In addition to one or more of the features described herein, or as an alternative, in further embodiments testing operation of the sensor assembly includes placing a known background in the detection region of the sensor assembly, and evaluating the known background to test functionality of the sensor assembly.

In addition to one or more of the features described herein, or as an alternative, in further embodiments opening the safety chain upon when testing operation of the sensor assembly, the evaluated known background is outside of a predetermined threshold.

In addition to one or more of the features described herein, or as an alternative, in further embodiments the test device includes a variable aperture placed across the detection region of the sensor assembly, such that during normal operation of the sensor assembly the aperture is in an open position and during test operation of the sensor assembly the aperture is in a closed position.

In addition to one or more of the features described herein, or as an alternative, in further embodiments the test device includes a movable cover having a fixed opening, such that during normal operation of the sensor assembly the fixed opening is positioned across the detection region and during test operation of the sensor assembly the movable plate blocks the detection region.

In addition to one or more of the features described herein, or as an alternative, in further embodiments the sensor assembly includes a sensor that measures distances to objects in the detection region.

In addition to one or more of the features described herein, or as an alternative, in further embodiments the sensor includes at least one of a LIDAR sensor, a millimeter wave RADAR sensor and an RGBD camera.

In addition to one or more of the features described herein, or as an alternative, in further embodiments the sensor assembly includes a safety chain contact as a component of the safety chain.

In addition to one or more of the features described herein, or as an alternative, further embodiments include detecting a tampering device when a detected background varies from an expected background.

In addition to one or more of the features described herein, or as an alternative, further embodiments include opening the safety chain when the detected background varies from the expected background.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
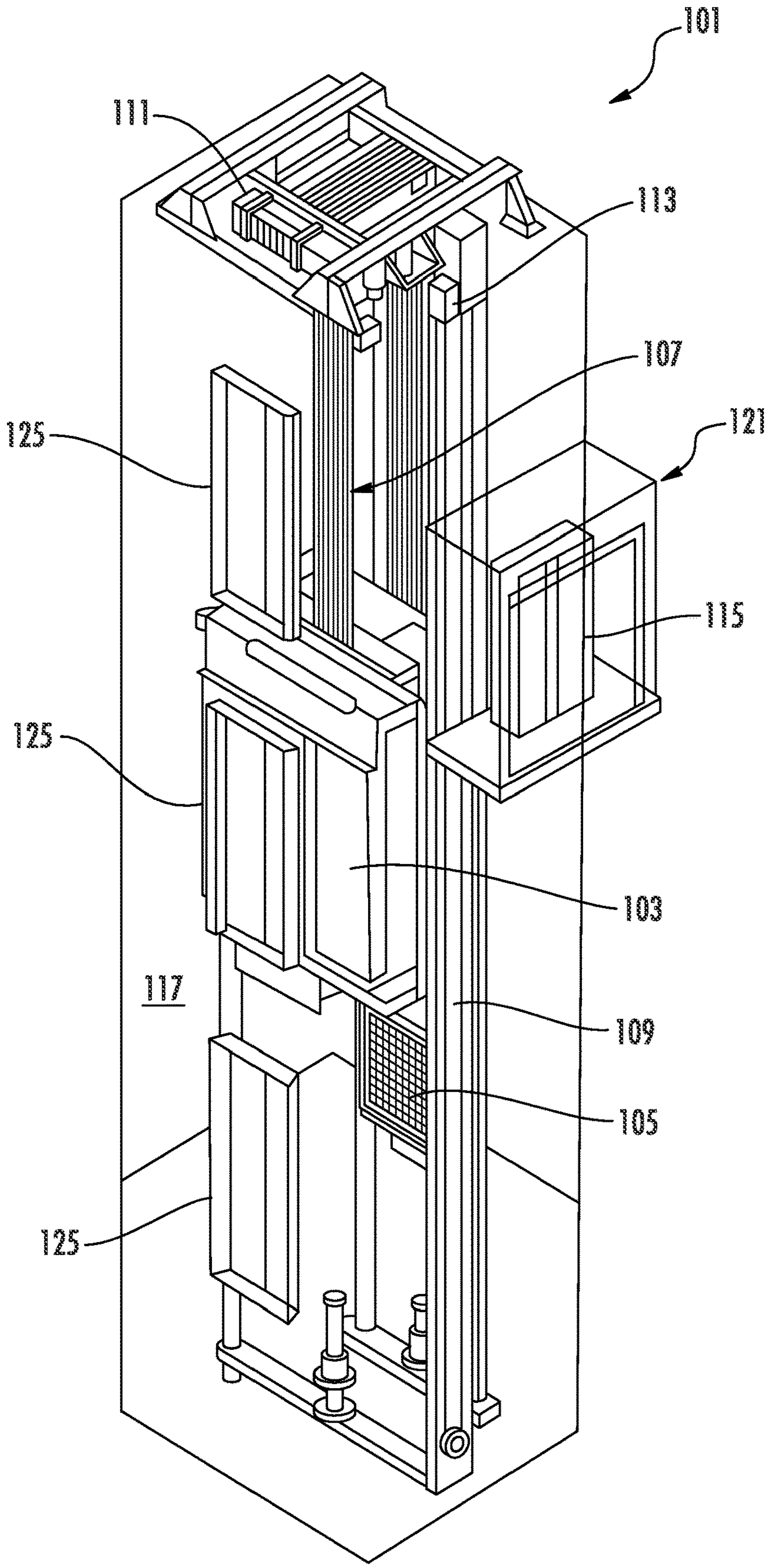
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft or hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 may be located, as shown, in a controller room 121 of the elevator shaft 117 and is configured to control the operation of the elevator system 101, and particularly the elevator car 103. It is to be appreciated that the controller 115 need not be in the controller room 121 but may be in the hoistway or other location in the elevator system. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller 115 may be located remotely or in a distributed computing network (e.g., cloud computing architecture). The controller 115 may be implemented using a processor-based machine, such as a personal computer, server, distributed computing network, etc.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

The elevator system 101 also includes one or more elevator doors 104. The elevator door 104 may be attached to the elevator car 103 or the elevator door 104 may be located on a landing 125 of the elevator system 101, or both. Embodiments disclosed herein may be applicable to both an elevator door 104 attached to the elevator car 103 or an elevator door 104 located on a landing 125 of the elevator system 101, or both. The elevator door 104 opens to allow passengers to enter and exit the elevator car 103.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels, or traction wheels). FIG. 1 is merely a non-limiting example presented for illustrative and explanatory purposes.

Figure 2A:
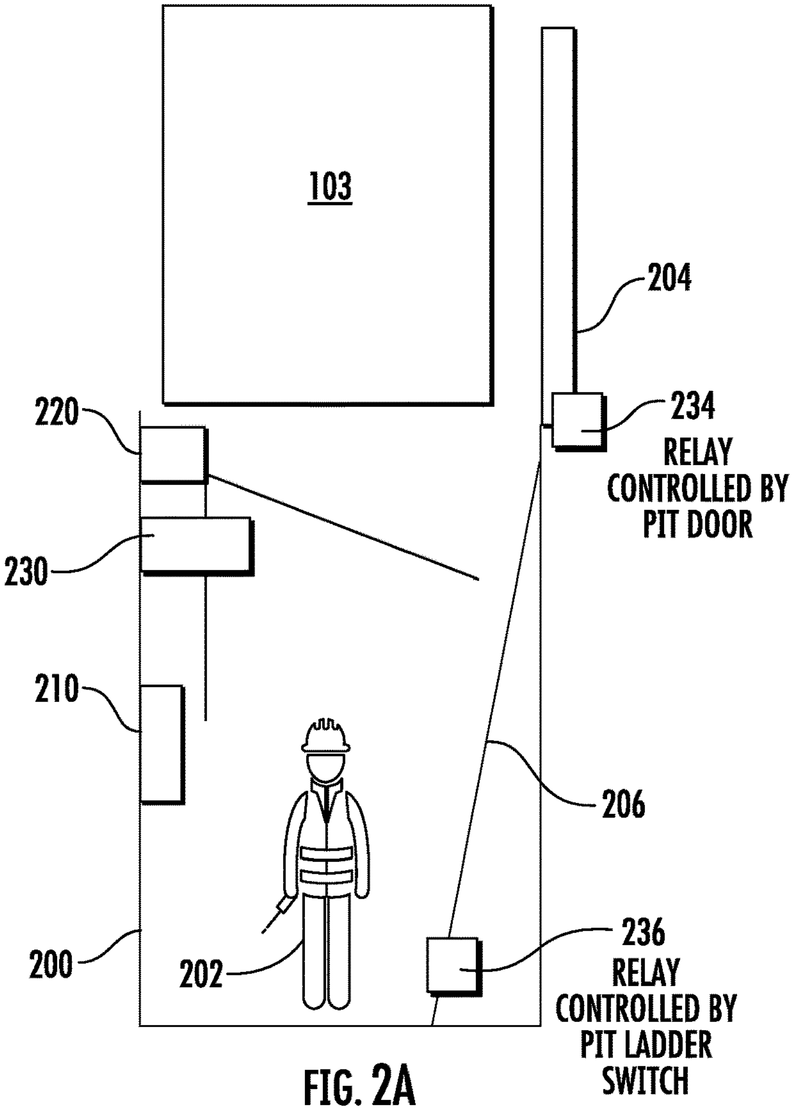
FIG. 2A depicts an elevator pit in an example embodiment.

FIG. 2A depicts an elevator pit 200 in an example embodiment. The elevator pit 200 is located at the bottom of the hoistway 117 and includes equipment that may need to be accessed or inspected by a person 202. Access to the pit 200 is through an access door 204, which may be a door at the lowest landing of the building or another door. A ladder 206 provides for entry to and exit from the pit 200. A sensor assembly 220 monitors the pit 200 for the presence of person(s) 202. While described herein as being located in and monitoring the pit 200, one skilled in the art will readily appreciate that the sensor assembly 200 may be located at and/or monitoring other locations in the hoistway 117, such as above or below the elevator car 103, above or below the counterweight 105, or the portion at or near the machine 111. A run-stop interface 210 is provides in the pit 200. The run-stop interface is manually operated by the person 202 to open or close a safety chain of the elevator system 101. When the safety chain is opened, the elevator car 103 is prevented from moving.

The elevator pit 200 in FIG. 2A includes safety chain contacts, including a sensor assembly safety chain contact 230, pit door safety chain contact 234 and a pit ladder safety chain contact 236. If any of the safety chain contacts 230, 234 and 236 are open, the elevator car 103 will be prevented from moving. Also, if the run-stop interface 210 is open, the elevator car 103 will be prevented from moving.

Figure 2B:
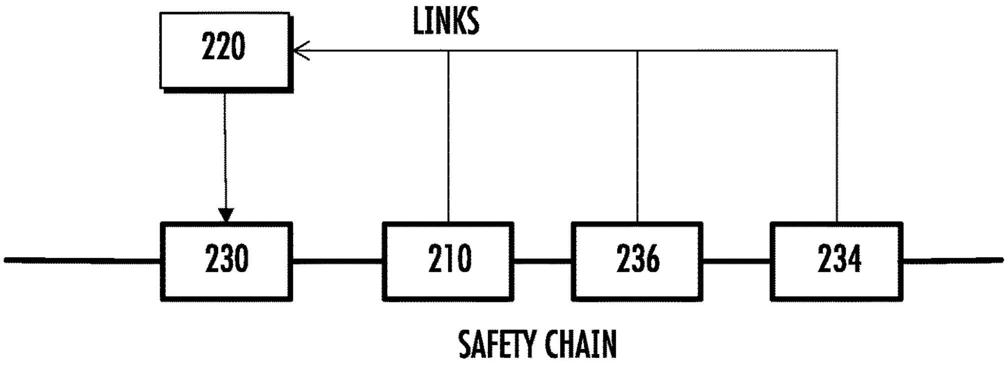
FIG. 2B depicts safety chain contacts of an elevator pit in an example embodiment.

FIG. 2B depicts safety chain contacts 230, 234 and 236 and the run-stop interface 210 of the elevator pit 200 in an example embodiment. The safety chain contacts 230, 234 and 236 and the run-stop interface 210 are part of a safety chain of the elevator system 101. If any of the safety chain contacts 230, 234 and 236 and the run-stop interface 210 is "open", then movement of the elevator car 103 is prevented. The safety chain contacts 230, 234 and 236 and the run-stop interface 210 are connected to the sensor assembly 220 by links so that the sensor assembly 220 can detect the status (e.g., open or closed) of each of the safety chain contacts 230, 234 and 236 and the run-stop interface 210. The links may be wired connections that allows the sensor assembly 220 to detect the status of each of the safety chain contacts 230, 234 and 236 and the run-stop interface 210.

Figure 3:
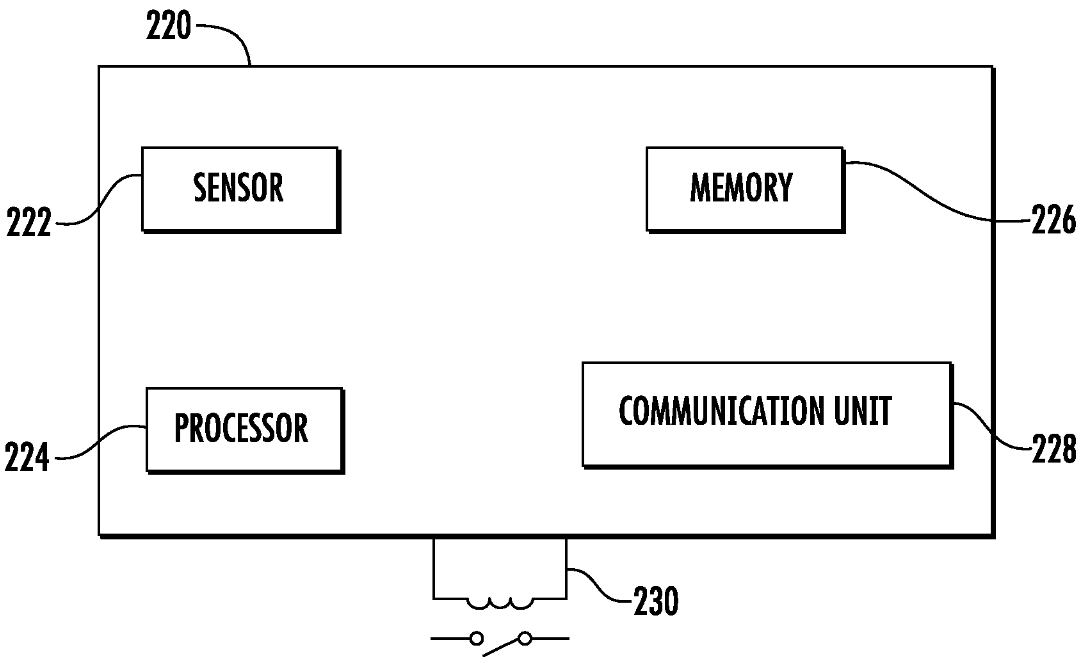
FIG. 3 depicts a sensor assembly in an example embodiment.

FIG. 3 depicts a sensor assembly 220 in an example embodiment. The sensor assembly 220 includes one or more sensors 222. The sensor 222 may be a distance sensor that generates distance measurements in a two-dimensional or three-dimensional field of view. The sensor 222 may be implemented using a LIDAR sensor, a millimeter wave RADAR sensor, an RGBD camera or other distance measuring sensors. The sensor assembly 220 includes a processor 224 that controls operation of the sensor assembly 220. The processor 224 may be implemented using a general-purpose microprocessor executing a computer program stored on a storage medium to perform the operations described herein. Alternatively, the processor 224 may be implemented in hardware (e.g., ASIC, FPGA) or in a combination of hardware/software. The processor 224 allows the sensor assembly 220 to perform computations locally, also referred to as edge computing. The processor 224 can send commands to other components of the elevator system 101 based on a result of the local computations.

The sensor assembly 220 includes a memory 226 that may store a computer program executable by processor 224, reference data, sensor data, etc. The memory 226 may be implemented using known devices such a random-access memory. The sensor assembly 220 includes a communication unit 228 which allows the sensor assembly 220 to communicate with other components of the elevator system 101, such as other sensor assemblies and/or the elevator controller 115. The communication unit 228 may be implemented using wired connections (e.g., LAN, ethernet, twisted pair, etc.) or wireless connections (e.g., WiFi, NFC, BlueTooth, etc.).

In operation, the sensor assembly 220 can open a safety chain of the elevator system 101 under certain conditions. A safety chain is a known component of elevator systems, and typically includes a number of contacts (e.g., relays) in series that control power to the elevator system machine 111 to enable or disable movement of the elevator car 103. If any of the contacts of the safety chain are open, then the elevator car 103 is prevented from moving. In an example embodiment, the sensor assembly 220 can control the sensor assembly safety chain contact 230 in order to open or close the safety chain. It is understood that sensor assembly safety chain contact 230 is one of several contacts making up the safety chain.

Figure 4:
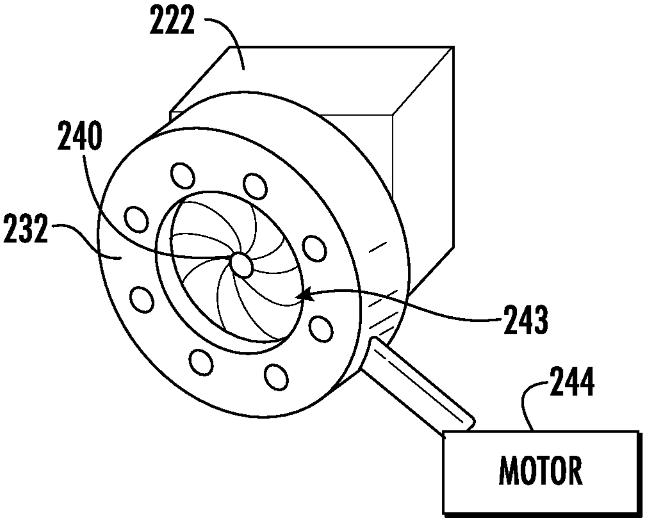
FIG. 4 depicts a test device of a sensor assembly in an example embodiment.
Figure 5:
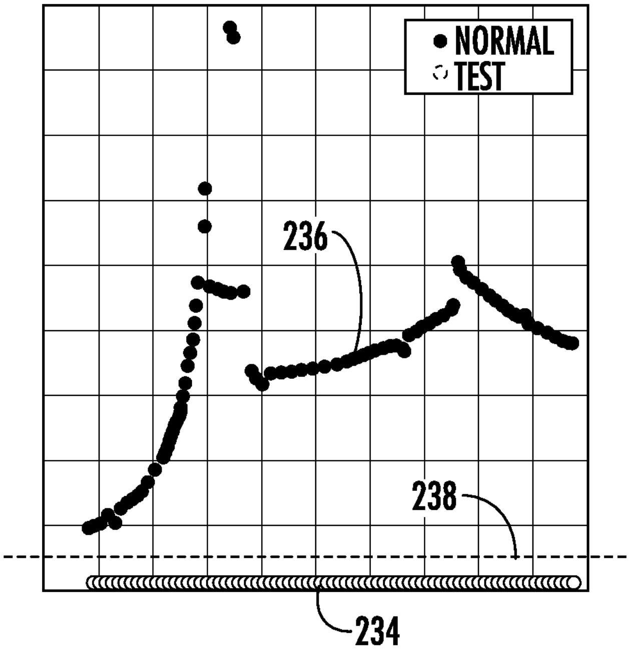
FIG. 5 depicts a graphical illustration of data from an example test of a sensor assembly.

It is desired to periodically or continuously evaluate the performance of the sensor 222 to ensure the sensor is, for example, undamaged or is free from tampering. The testing aids in preventing false positive indications and false negative indications when the sensor assembly 220 monitors the pit 200. Referring now to FIG. 4, illustrated is an embodiment of a sensor 222 and a test device 232. The test device 232, when activated, puts a known background into the view field of the sensor 222 at a known distance. This can also be referred to as a "known background datum pattern." The test device 232, when activated together with the sensor 222, results in a well-defined point cloud target pattern 234, as illustrated in FIG. 5 compared to a normal point cloud pattern 236 of the pit 200. Fluctuation of the target pattern 234 beyond a preselected threshold 238 is indicative of an unhealthy, malfunctioning, failing or otherwise not correctly operating sensor 222, and may result in operation of the safety chain contact 230 to disable movement of the elevator car 103. Further, deviations about the target pattern 234 may be indicative of the health of the sensor assembly 220 and may be communicated to the controller 115 or other devices such as cloud computing for condition-based monitoring to register maintenance actions for the sensor assembly 220.

Figure 6:
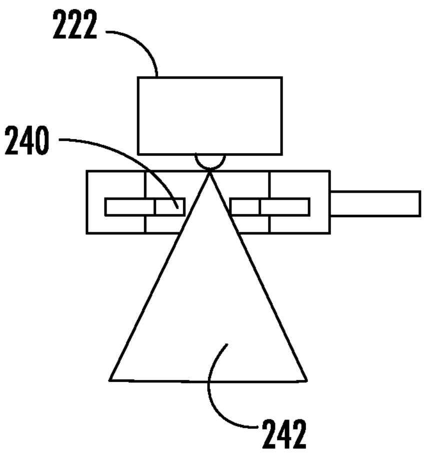
FIG. 6 depicts another view of a test device of a sensor assembly in an example embodiment.
Figure 7:
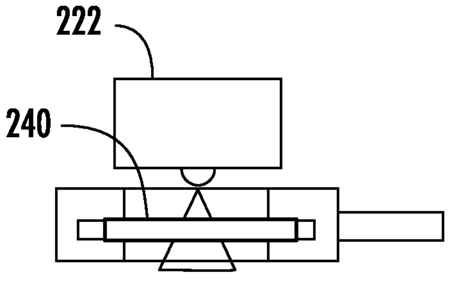
FIG. 7 depicts yet another view of a test device of a sensor assembly in an example embodiment.

One exemplary test device 232 is illustrated in FIGS. 4, 6 and 7, and includes a controllable aperture 240 positioned across the field of view 242 of the sensor 222. In normal operation, such as illustrated in FIGS. 4 and 6, the aperture 240 is in an open position allowing for normal operation of the sensor 222 in detecting objects in the pit 200. The aperture 240 may be controlled by movement of a diaphragm 243 driven by a motor 244. The test device 232 is controlled by the sensor assembly 200 to periodically automatically or upon initiation of a test by an operator, close the aperture 240 across the field of view 242. When the aperture 240 is closed across the field of view 242, such as illustrated in FIG. 7, the sensor 222 can be expected to produce the point cloud target pattern 234, such as illustrated in FIG. 5.

Figure 8:
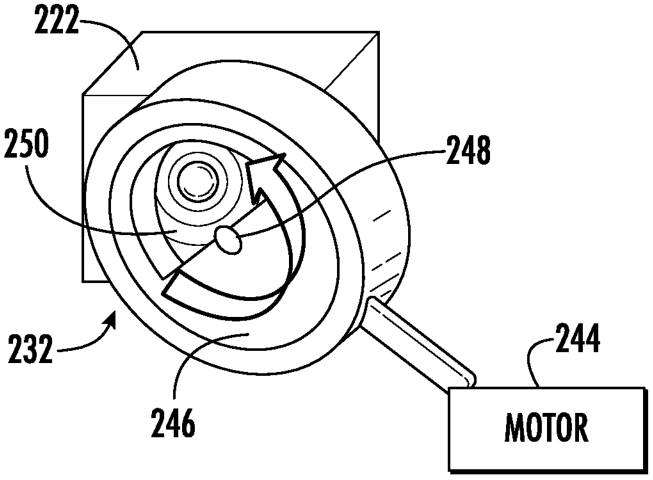
FIG. 8 depicts a test device of a sensor assembly in another example embodiment.
Figure 9:
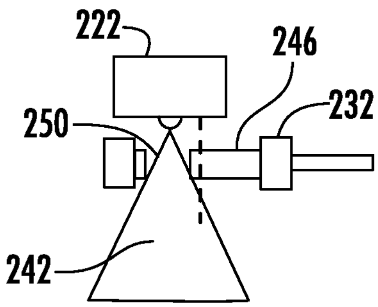
FIG. 9 depicts another view of a test device of a sensor assembly in another example embodiment.
Figure 10:
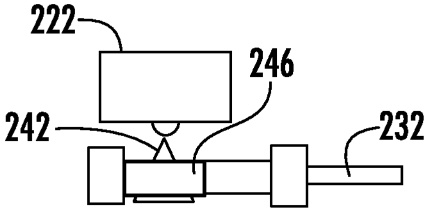
FIG. 10 depicts yet another view of a test device of a sensor assembly in another example embodiment.

In another embodiment, illustrated in FIG. 8-10, the test device 232 includes a plate 246 rotatable about a plate axis 248 and having a plate opening 250 therein. In normal operation, the plate 246 is positioned such that the plate opening 250 is across the field of view 242 of the sensor 222 allowing for normal operation of the sensor 222 in detecting objects in the pit 200, as illustrated in FIGS. 8 and 9. The test device 232 is controlled by the sensor assembly 200 to periodically automatically or upon initiation of a test by an operator, rotate the plate 246 about the plate axis 248 as driven by motor 244. The plate 246 is rotated about the plate axis 248 so the plate 246 blocks the field of view 242 of the sensor 222, such as illustrated in FIG. 10, the sensor 222 can be expected to produce the point cloud target pattern 234, such as illustrated in FIG. 5.

Figure 11:
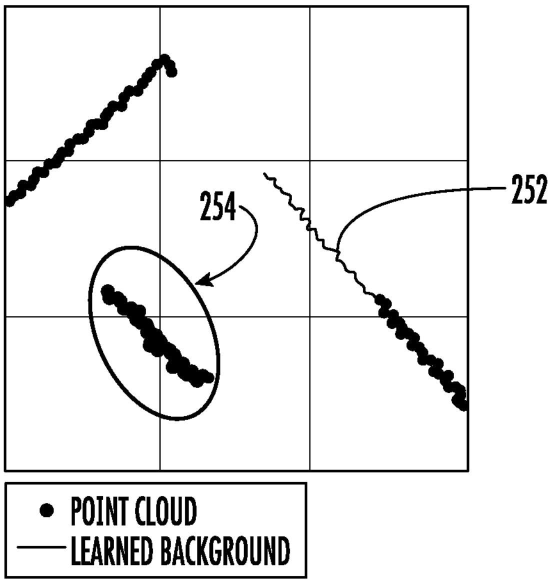
FIG. 11 is a graphical illustration of data from a sensor assembly indicating tampering with operation of the sensor assembly.
Figure 12:
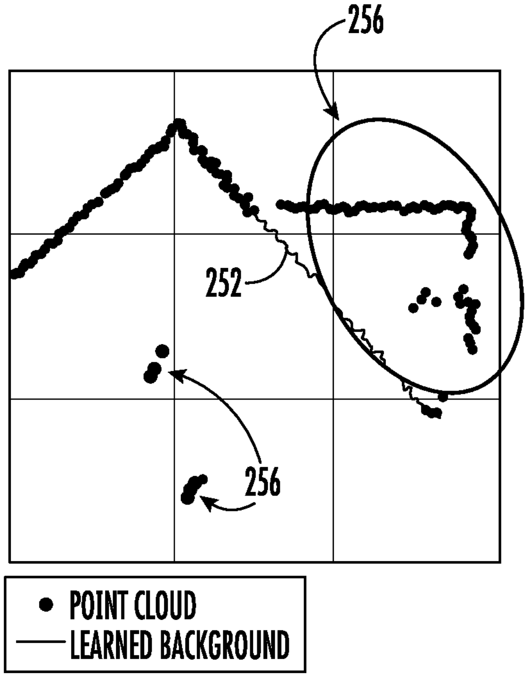
FIG. 12 is another graphical illustration of data from a sensor assembly indicating tampering with operation of the sensor assembly.

In addition to detecting damage or malfunctioning of a sensor assembly 220, it is desired to detect if the sensor assembly 220 or its operation has been tampered with by, for example, a person wanting to perform a task in the pit 200 in an unsafe manner. To accomplish such detection, the sensor assembly 220 is configured to detect a highly reflective surface, such as a mirror, placed in the field of view 242 of the sensor 222. As illustrated in FIG. 11, the sensor assembly 220 is configured to detect a known background 252, or an expected representation of the pit 200. When an object such as a mirror is placed in the field of view 242, the collected data represented as point cloud 254 deviates greatly and sharply from the known background 252. In the illustration of FIG. 11, the sensor 222 detects an opaque side of a mirror as represented by point cloud 254, while in the illustration of FIG. 12 the sensor detects opaque trim surrounding the mirror as represented by point cloud 256. When the detected point clouds, such as point clouds 254 and 256 are detected which deviate greatly and sharply from the known background 252, this may indicate tampering with the operation of the sensor assembly 220. In some embodiments, the detection of such variation may result in operation of the safety chain contact 230 to disable movement of the elevator car 103.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
a hoistway;
an elevator car configured to travel in the hoistway;
a pit located at a bottom of the hoistway;
a safety chain configured to enable or disable motion of the elevator car;
a sensor assembly configured to initiate opening the safety chain to disable motion of the elevator car upon detection of a person in a detection region of the sensor assembly in the hoistway; and
a test device configured to test operation of the sensor assembly to detect malfunctioning and/or tampering of operation of the sensor assembly;
wherein the test device is configured to place a known background across a field of view of the sensor assembly such that the sensor assembly evaluates the known background to test functionality of the sensor assembly.

2. The elevator system of claim 1, wherein the sensor assembly is configured to open the safety chain upon when testing operation of the sensor assembly, the evaluated known background is outside of a predetermined threshold.

3. The elevator system of claim 1, wherein the test device includes a variable aperture placed across the field of view of the sensor assembly, such that during normal operation of the sensor assembly the aperture is in an open position and during test operation of the sensor assembly the aperture is in a closed position.

4. The elevator system of claim 1, wherein the test device includes a movable plate having a fixed opening, such that during normal operation of the sensor assembly the fixed opening is positioned across the field of view and during test operation of the sensor assembly the movable plate blocks the field of view.

5. The elevator system of claim 1, wherein the sensor assembly includes a sensor that measures distances to objects in the hoistway.

6. The elevator system of claim 5, wherein the sensor includes at least one of a LIDAR sensor, a millimeter wave RADAR sensor and an RGBD camera.

7. The elevator system of claim 1, wherein the sensor assembly includes a safety chain contact as a component of the safety chain.

8. An elevator system comprising:
a hoistway;
an elevator car configured to travel in the hoistway;
a pit located at a bottom of the hoistway;
a safety chain configured to enable or disable motion of the elevator car;
a sensor assembly configured to initiate opening the safety chain to disable motion of the elevator car upon detection of a person in a detection region of the sensor assembly in the hoistway; and
a test device configured to test operation of the sensor assembly to detect malfunctioning and/or tampering of operation of the sensor assembly;
wherein the sensor assembly is configured to detect a tampering device when a detected background varies from an expected background.

9. The elevator system of claim 8, wherein the sensor assembly is configured to open the safety chain when the detected background varies from the expected background.

10. A method of operating an elevator system including a hoistway, an elevator car configured to travel in the hoistway, a pit located at a bottom of the hoistway, a safety chain configured to enable or disable motion of the elevator car and a sensor assembly, the method comprising:
detecting, by the sensor assembly, a person in a detection region of the sensor assembly in the hoistway;
upon detection of a person in the detection region, the sensor assembly initiating opening the safety chain to disable motion of the elevator car; and
testing operation of the sensor assembly to detect malfunctioning and/or tampering of operation of the sensor assembly;

wherein testing operation of the sensor assembly includes:

placing a known background in the detection region of the sensor assembly; and evaluating the known background to test functionality of the sensor assembly.

11. The method of claim 10, further comprising opening the safety chain upon testing the operation of the sensor assembly, and the evaluated known background is outside of a predetermined threshold.

12. The method of claim 10, wherein the test device includes a variable aperture placed across the detection region of the sensor assembly, such that during normal operation of the sensor assembly the aperture is in an open position and during test operation of the sensor assembly the aperture is in a closed position.

13. The method of claim 10, wherein the test device includes a movable cover having a fixed opening, such that during normal operation of the sensor assembly the fixed opening is positioned across the detection region and during test operation of the sensor assembly the movable plate blocks the detection region.

14. The method of claim 10, wherein the sensor assembly includes a sensor that measures distances to objects in the detection region.

15. The method of claim 14, wherein the sensor includes at least one of a LIDAR sensor, a millimeter wave RADAR sensor and an RGBD camera.

16. The method of claim 10, wherein the sensor assembly includes a safety chain contact as a component of the safety chain.

17. The method of claim 10, further comprising detecting a tampering device when a detected background varies from an expected background.

18. The method of claim 17, further comprising opening the safety chain when the detected background varies from the expected background.

* * * * *